United States Patent
Chen et al.

(10) Patent No.: US 8,107,756 B2
(45) Date of Patent: Jan. 31, 2012

(54) DIGITAL IMAGE TONE REMAPPING METHOD AND APPARATUS

(75) Inventors: Shing-Chia Chen, Sinshih Township, Tainan County (TW); Ling-Hsiu Huang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1004 days.

(21) Appl. No.: 11/871,069

(22) Filed: Oct. 11, 2007

(65) Prior Publication Data

US 2009/0097777 A1    Apr. 16, 2009

(51) Int. Cl.
G06K 9/40    (2006.01)
(52) U.S. Cl. .................................. 382/254; 382/274
(58) Field of Classification Search .................. None
See application file for complete search history.

(56) References Cited

U.S. PATENT DOCUMENTS

| | | | | |
|---|---|---|---|---|
| 5,808,697 | A * | 9/1998 | Fujimura et al. | 348/672 |
| 6,018,588 | A * | 1/2000 | Kim | 382/167 |
| 7,340,091 | B2 * | 3/2008 | Lin | 382/169 |
| 7,835,588 | B2 * | 11/2010 | Parkkinen et al. | 382/274 |
| 2002/0171852 | A1 * | 11/2002 | Zhang et al. | 358/1.9 |
| 2004/0057632 | A1 * | 3/2004 | Gindele | 382/274 |
| 2005/0031201 | A1 * | 2/2005 | Goh | 382/169 |
| 2005/0100242 | A1 * | 5/2005 | Trifonov et al. | 382/274 |
| 2007/0041636 | A1 * | 2/2007 | Yoon et al. | 382/169 |
| 2007/0268534 | A1 * | 11/2007 | Duan et al. | 358/520 |
| 2008/0238935 | A1 * | 10/2008 | Huang et al. | 345/617 |
| 2009/0060367 | A1 * | 3/2009 | Wei | 382/260 |

OTHER PUBLICATIONS

W. Duch and N. Jankowski,"Bi-Radial Transfer Functions", Proc. Second Conference on Neural Networks and Their Applications, 1996.*

* cited by examiner

*Primary Examiner* — Li Liu
(74) *Attorney, Agent, or Firm* — Stout, Uxa, Buyan & Mullins, LLP

(57) ABSTRACT

A digital image tone remapping method is disclosed. The method includes computing an average luminance value of a digital image; generating a preliminary tone mapping function according to the average luminance value; generating a luminance statistic of the digital image; determining new remapped values for a plurality of skeleton luminance values according to the preliminary tone mapping function and the luminance statistic; generating a final tone mapping function according to the new remapped values and the plurality of skeleton luminance values; and remapping the digital image through the final tone mapping function. The present invention also discloses an apparatus performing the method.

16 Claims, 4 Drawing Sheets

DIGITAL IMAGE TONE REMAPPING METHOD AND APPARATUS

BACKGROUND OF THE INVENTION

1. Field of the Invention

The present invention relates to digital image processing, and more particularly to a digital image tone remapping method and apparatus.

2. Description of the Prior Art

Digital image tone mapping is a function widely supported in the video processing unit of a digital image rendering device, such as a display device or a printer. The tone mapping function converts luminance code values of an input image from a predetermined range defined by the bit resolution of the input image to another desired range associated with the rendering device.

The input image may be either a monochrome image or a color image. For a monochrome image, for example, the gray levels of pixels are themselves used as the luminance components. For a color image, each pixel of the input image typically contains three or four components to define a color. In RGB color space, for example, these primary colors are red, green and blue, and the luminance component of each pixel can be obtained by a weighted summing of the red, green, and blue components of the pixel data. The color components of the remapped image may be obtained through the corresponding remapped luminance value proportionally.

The tone mapping function may be either static or adaptive. A static tone mapping function is defined by an invariant transfer function for all input images. An adaptive tone mapping function, on the other hand, may be dynamically adjusted according to desirable characteristics of the input image. Contrast improvement is usually taken into account when attempting to generate a rendered image that looks right with respect to the original scene. Due to the wide range of distributing status of pixels in different images, it is typically difficult to use a single static tone mapping function to fit all kind of images for contrast improvement purpose.

As a result, there exists a substantial need for an efficient method and apparatus involving an adaptive tone mapping function capable of improving image contrast, and preferably simple, low cost and easy to implement.

SUMMARY OF THE INVENTION

The present invention therefore aims to provide a tone mapping method and apparatus for digital images.

In accordance with an aspect of the present invention, a digital image tone remapping method is provided. The method includes computing an average luminance value of a digital image; generating a preliminary tone mapping function according to the average luminance value; generating a luminance statistic of the digital image; determining new remapped values for a plurality of skeleton luminance values according to the preliminary tone mapping function and the luminance statistic; generating a final tone mapping function according to the new remapped values and the plurality of skeleton luminance values; and remapping the digital image through the final tone mapping function. The present invention also discloses an apparatus performing the method.

The present invention is also directed to a digital image tone remapping apparatus which includes an image analysis unit 310, a preliminary tone mapping function generating unit 320, a remapped value adjusting unit 330, a final tone mapping function generating unit 340 and an image remapping unit 350. Such units cooperate with each other to implement above method.

DETAILED DESCRIPTION OF THE INVENTION

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention. Furthermore, in the following description as well as the language of claims, the asterisk sign "*" is used to represent a multiplying operation. The expression "Cmax*X", for example, means the product of the number Cmax and the number X.

Figure 1:
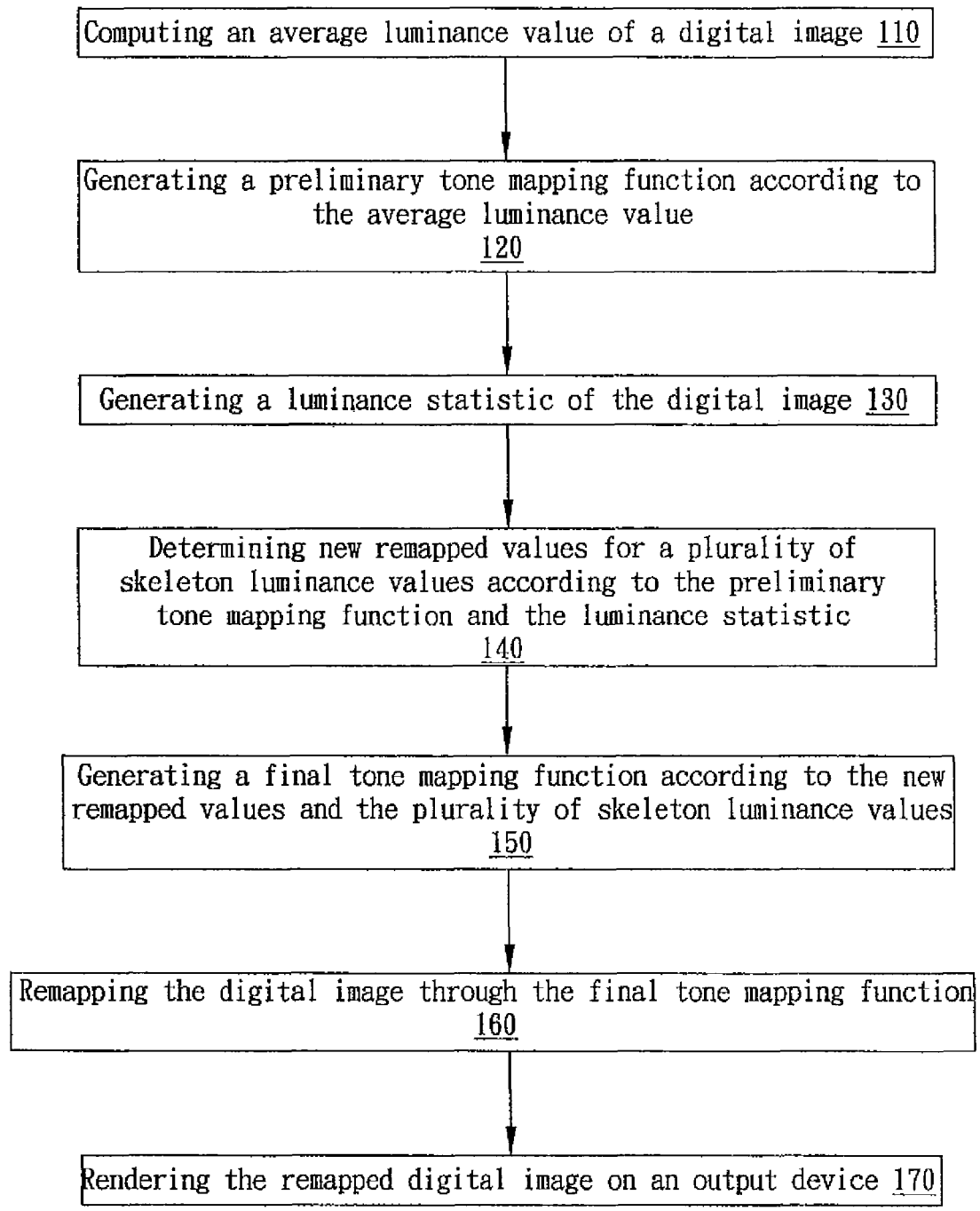
FIG. 1 is a flow diagram illustrating a digital image tone remapping method in accordance with an aspect of the present invention.

With reference to FIG. 1, which is a flow diagram illustrating a digital image tone remapping method in accordance with an aspect of the present invention.

In step 110, an average luminance value of a digital image is computed. The digital image may be a digital still image. Alternatively, the digital image may be an image frame within a video stream. Typically, the digital image may be an image frame decoded from a video stream compressed with a specific image compression standard. As should be appreciated, the digital image may be represented as an array of pixels, in which each pixel contains one or more numerical components that define optical characteristic of the pixel, such as luminance and/or chroma information. In the following description, the digital image may be accessed from a suitable location such as the system memory.

The digital image is typically represented by a two dimensional array of code values standing for gray levels or color data of respective pixels. The average luminance value of the digital image may be obtained by summing up the luminance components of all pixels, then dividing the sum by the count of pixels of the digital image, and then round the result to the closest integer.

In step 120, a preliminary tone mapping function $T_P(x)$ according to said average luminance value is generated. In the following description, please also refer to FIG. 2A, which shows a graphic representation of the preliminary tone mapping function $T_P(x)$ generated in step 120 in accordance with a preferred embodiment of the present invention. The average luminance value of the digital image is denoted as APL (average pixel level) in FIG. 2A. Specifically, in this example, as can be noted in FIG. 2A, the average luminance value APL lies in between the luminance values 50 and 100, and is closer to 50 (in fact, the illustrated APL is 54 in this example).

Figure 2A:
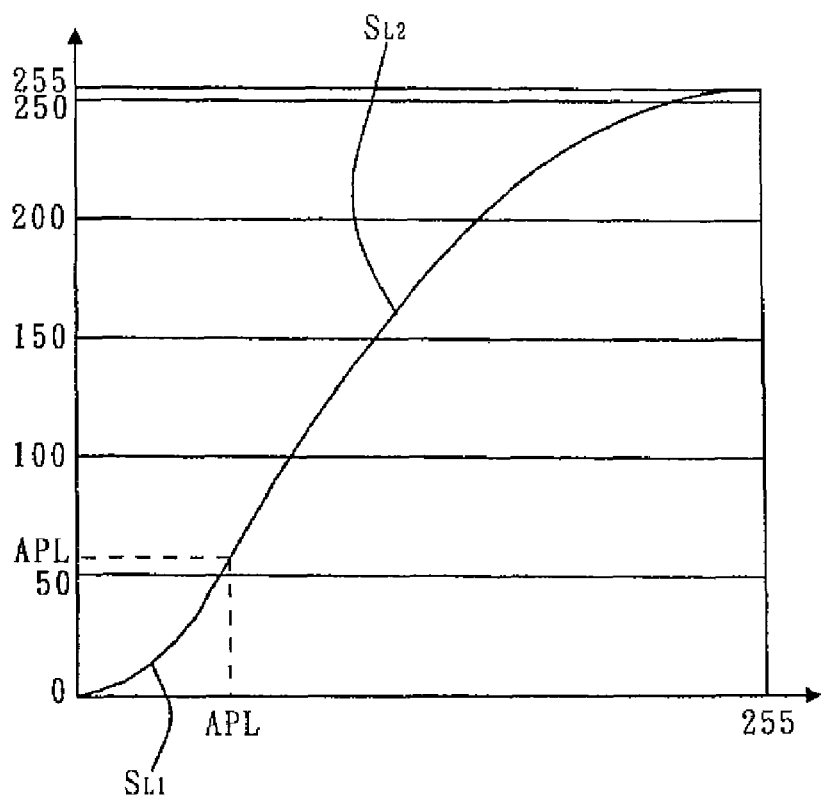
FIG. 2A shows a graphic representation of a preliminary tone mapping function $T_P(x)$ in accordance with a preferred embodiment of the present invention.

The behavior of the preliminary tone mapping function $T_P(x)$ is detailed below. Firstly, the preliminary tone mapping function $T_P(x)$ remaps the average luminance value APL to itself. Secondly, the preliminary tone mapping function $T_P(x)$ remaps any luminance value X less than the average luminance value APL through a first local mapping function $T_{L1}(X)=X*(X/APL+r0*(APL-X)/Cmax)$ represented by the curve $S_{L1}$ as shown in FIG. 2A, in which r0 is a predetermined number which functions as an effective slope for X equals 0. In other words, the local mapping function $T_{L1}(X)$ will multiply the luminance value X by a factor $(X/APL+r0*(APL-X)/Cmax)$. The notation Cmax stands for the maximum code value in the current bit resolution of the digital image. When the bit resolution is 8 (i.e., 8 bits are used to encode the luminance component), for example, the possible code value for the luminance will range from 0 to 255 ($2^8-1$), and the maximum code value Cmax will be 255. The predetermined number r0 may be selected empirically to be a number between 0 and 1. In an embodiment, r0 is 0 (i.e., the effective slope of for X at 0 is 0), and $T_{L1}(X)$ will multiply the luminance value X by a factor X/APL proportional to the luminance value X itself. Note that the factor $(X/APL+r0*(APL-X)/Cmax)$ will increase from r0*APL/Cmax to 1 for luminance values ranging from 0 to the average luminance value APL. Also note that the local mapping function $T_{L1}(X)$ remaps the average luminance value APL to the average luminance value APL itself. Furthermore, the preliminary tone mapping function $T_P(x)$ remaps any luminance value X greater than the average luminance value APL through a second local mapping function $T_{L2}(X)=(Cmax--)*(X-APL)/Cmax+X$, which is represented by the curve $S_{L2}$ as shown in FIG. 2A. Note that the local mapping function $T_{L2}(X)$ remaps the average luminance value APL and the maximum code value Cmax to the average luminance value APL and the maximum code value Cmax themselves respectively.

In summary, the preliminary tone mapping function $T_P(x)$ may be defined by:

$$T_P(X)=X*(X/APL+r0*(APL-X)/Cmax), \text{ for } X \text{ less than APL,} \quad (1)$$

$$T_P(APL)=APL, \text{ and} \quad (2)$$

$$T_P(X)=(Cmax-X)*(X-APL)/Cmax+X, \text{ for } X \text{ greater than APL.} \quad (3)$$

In step 130, a luminance statistic, such as a histogram, of the digital image is generated. A histogram, as should be appreciated by those skilled in the art, records occurrence frequencies of all possible luminance values of pixels in the digital image.

In step 140, new remapped values for a plurality of skeleton luminance values are determined according to the preliminary tone mapping function $T_P(x)$ and the luminance statistic.

Figure 2B:
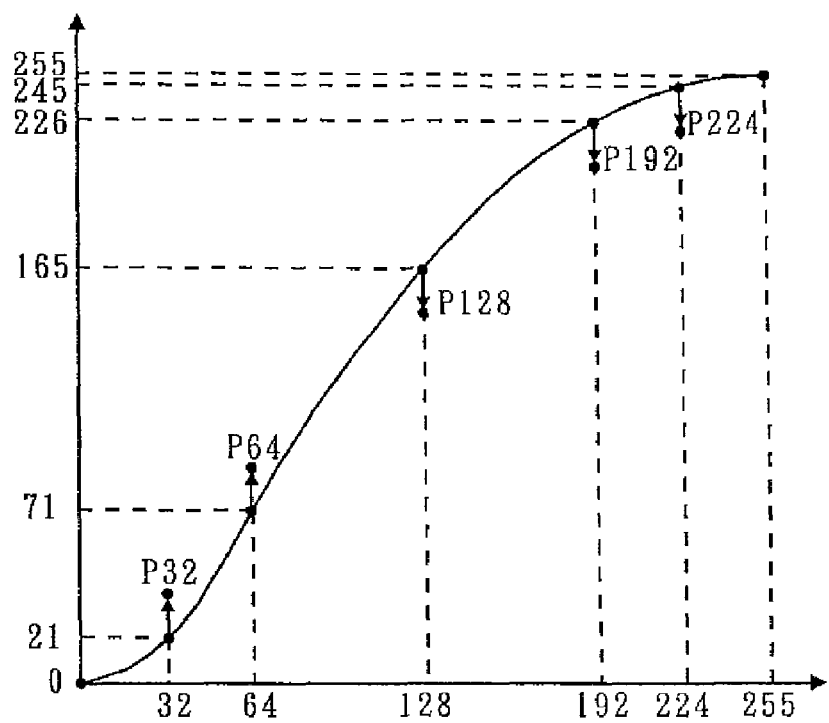
FIG. 2B shows the skeleton luminance values, the remapped values thereof through the preliminary tone mapping function $T_P(x)$ shown in FIG. 2, and their new remapped values determined in accordance with a preferred embodiment of the present invention.

Please also refer to FIG. 2B in the following description. FIG. 2B shows the skeleton luminance values, the remapped values thereof through the preliminary tone mapping function $T_P(x)$ shown in FIG. 2A, and their new remapped values determined in accordance with a preferred embodiment of the present invention. In this embodiment, the skeleton luminance values include 32, 64, 128, 192 and 224. The remapped values thereof through the preliminary tone mapping function $T_P(x)$ shown in FIG. 2A are respectively 21 (for r0 equals 0.75), 71, 165, 226 and 245. Of course, the skeleton luminance values are not limit to those shown above and number of the skeleton luminance values is not limit to five.

To determine the new remapped value for the skeleton luminance value 128, for example, distribution of pixels lying in two predetermined ranges adjacent to the skeleton luminance value 128 may be taken into account. In this preferred embodiment, the two predetermined ranges may be (0,127) and (128,255) which stand for respectively luminance values lying between 0 and 127 (0 and 127 included) as well as luminance values lying between 128 and 255 (128 and 255 included). The two predetermined ranges (0,127) and (128, 255) will be referred to as the first range and the second range hereinafter. It should be noted that the first and second ranges contain substantially identical number of luminance values. Due to the large amount of pixel data generally contained in a digital image, disagreement with one or two luminance values between the exact scales (i.e., counts of different luminance values) of the two ranges usually makes no significant difference.

Numbers of pixels lying in the first and second ranges are then counted respectively to get a first pixel count and a second pixel count associated respectively with the first and second ranges. In this preferred embodiment, it is noted that pixels lying in the first range are darker than pixels lying in the second range.

In general, when the first pixel count is greater than the second pixel count (i.e., darker pixels dominate), the new remapped value for the skeleton luminance value 128 will be set to a value greater than the preliminary remapped value thereof, which equals 175 in this case as mentioned above. Otherwise, when the first pixel count is less than the second pixel count, then the new remapped value for the skeleton luminance value 128 will be set to a value less than the preliminary remapped value thereof. When the difference between the first and the second pixel counts gets larger, then the new remapped value for skeleton luminance value 128 may be set to a value farther from the preliminary remapped value. If, in the extreme case, the first pixel count should exactly equal the second pixel count, although unlikely to happen, then the new remapped value is set to the preliminary remapped value.

Specifically, an adjusting factor may be derived from the ratio of the first pixel count to the second pixel count. The new remapped value for the skeleton luminance value 128 may then be determined such that the difference between the new remapped value and the preliminary remapped value is substantially proportional to the adjusting factor. The ratio is denoted as R in following description. When the ratio R is greater than 1, then the adjusting factor may be set to R−1. When the ratio R is less than 1, then the adjusting factor may be set to 1/R−1. When the ratio R is 1, which is the unlikely case mentioned above, then the adjusting factor may be set to 0, i.e., no adjusting is necessary. The difference between the new remapped value and the preliminary remapped value may then be set to the adjusting factor multiplied by a scaling factor determined, for example, empirically or experimentally.

In another embodiment, an upper limit and a lower limit are assigned for the skeleton luminance value 128 such that if the new remapped value determined above is larger than the upper limit (respectively less than the lower limit), then the newly remapped value is set to the upper limit (respectively set to the lower limit). The upper limit (or the lower limit) may be selected such that the difference between the upper limit (or the lower limit) and the preliminary remapped value equals to the preliminary remapped value multiplied by a predetermined factor. Alternatively, the upper limit and/or the lower limit may be selected empirically.

In another embodiments, the new remapped value for the skeleton luminance value 128 may be determined according to other distributing status or statistic quantity, as long as derivable from the histogram, of pixels lying in the two pre-determined ranges, such as the average luminance values of respective ranges, the average luminance values of part of pixels in the respective ranges, the median of respective ranges, etc.

Similar operations may be repeated for the remaining skeleton luminance values (i.e., 32, 64, 192 and 224) to determine the respective new remapped values. Depending on the skeleton luminance value, different ranges may be used to determine the respective new remapped values. For example, the two ranges used to determine the new remapped values for the skeleton luminance values 32, 64, 192 and 224 may be respectively {(0,31),(32,63)}, {(0,63),(64,128)}, {(128,191), (192,255)} and {(192,223),(224,255)}. The notations P32, P64, P128, P192 and P224 respectively stand for the points defined by the illustrated skeleton luminance values and their corresponding new remapped values.

The plurality of skeleton luminance values, as implied by the name, and their new remapped values determined in this step will form the backbone of the final tone mapping function $T_F(x)$, as is detailed in the following step.

Figure 2C:
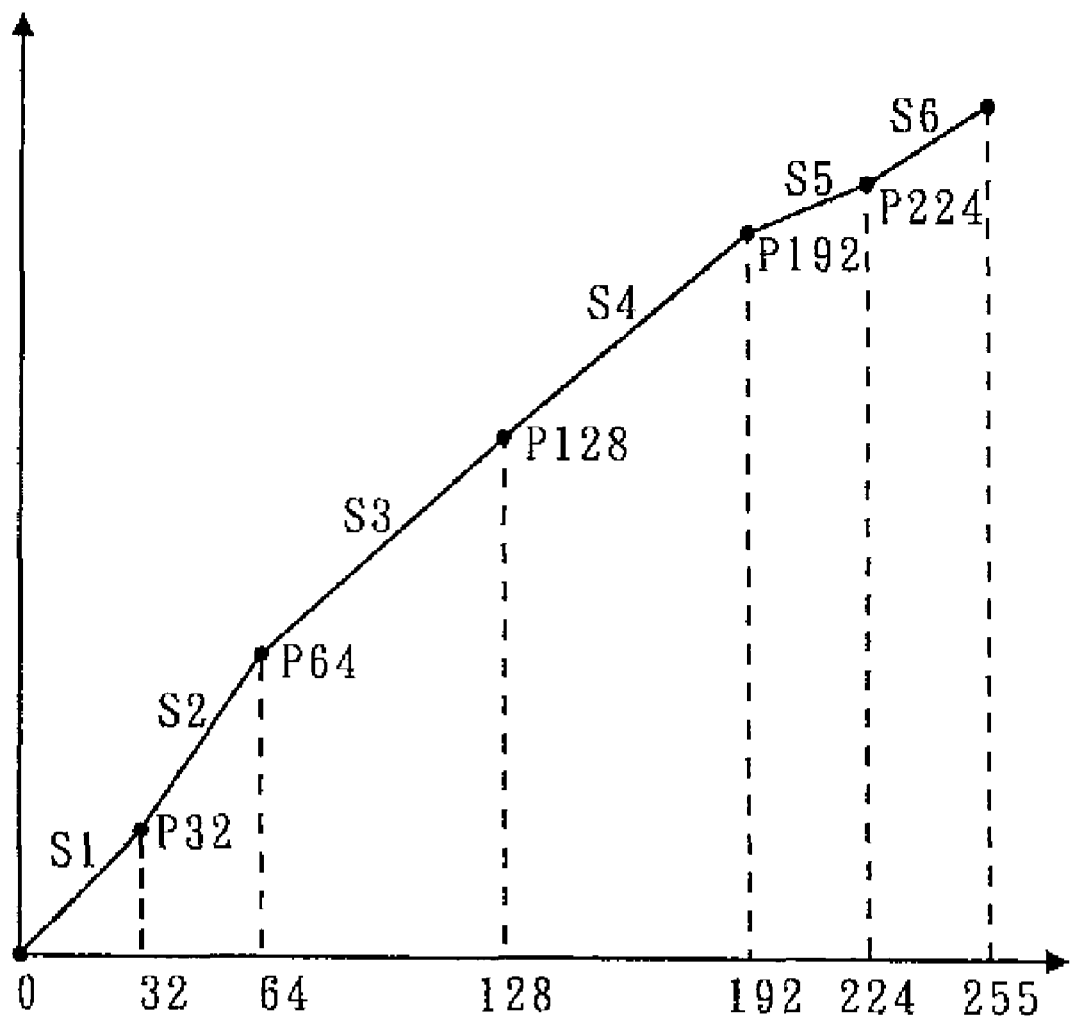
FIG. 2C shows a graphic representation of a final tone mapping function generated in accordance with a preferred embodiment of the present invention.

In step 150, a final tone mapping function $T_F(x)$ is generated according to the new remapped values and the plurality of skeleton luminance values. Please also refer to FIG. 2C in the following description. FIG. 2C shows a graphic representation of a final tone mapping function $T_F(X)$ generated in accordance with a preferred embodiment of the present invention. In this embodiment, the final tone mapping function $T_F(X)$ generated is a piecewise linear tone remapping function represented by six line segments S1-S6 consecutively connected to each other one by one, in which S1-S6 are line segments respectively connecting the six pairs of end points {(0,0)-P32}, {P32-P64}, {P64-P128}, {P128-P192}, {P192-P224} and {P224-(255,255)}, where the notations P32, P64, P128, P192 and P224 respectively stand for the end points defined by the illustrated skeleton luminance values and their new remapped value determined in step 140.

In step 160, the digital image is remapped through the final tone mapping function $T_F(x)$. In step 170, the remapped digital image is rendered on an output device, such as a monitor, display or a printer.

Figure 3:
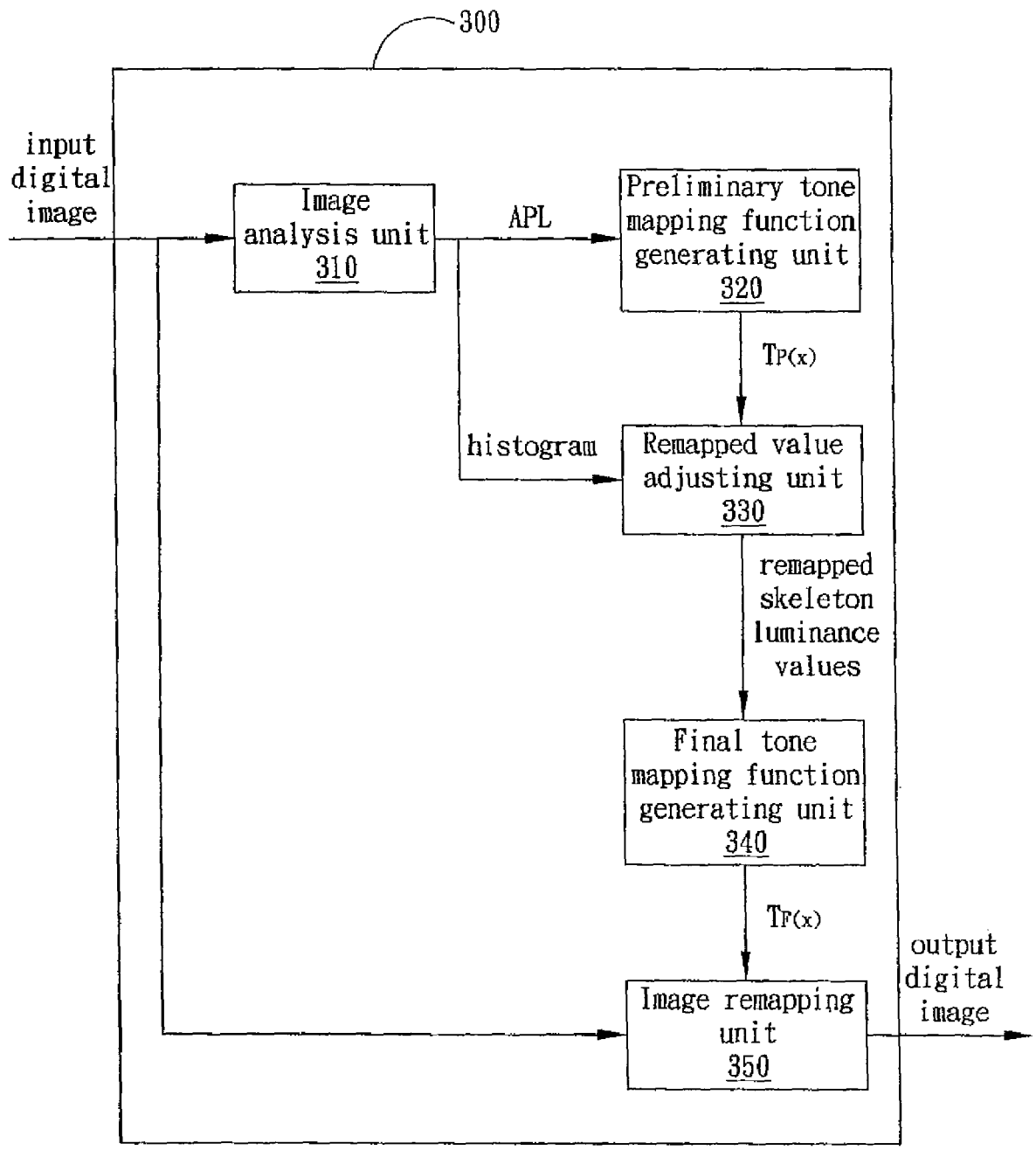
FIG. 3 shows a digital image tone remapping apparatus in accordance with an embodiment of the present invention.

The present invention also includes an apparatus implementing the method disclosed above. FIG. 3 shows a digital image tone remapping apparatus 300 in accordance with an embodiment of the present invention. In general, the digital image tone remapping apparatus 300 may be a portion of a digital image processing unit in an image rendering system which may be a display device or a printer. The digital image tone remapping apparatus 300 includes an image analysis unit 310, a preliminary tone mapping function generating unit 320, a remapped value adjusting unit 330, a final tone mapping function generating unit 340 and an image remapping unit 350. Please refer to FIG. 3 as well as FIG. 1 in the following description. The preliminary tone mapping function generating unit 320 is communicated with the remapped value adjusting unit 330.

The image analysis unit 310 may be configured to perform aforementioned steps 110 and 130 to compute the average luminance value of a digital image and generate the luminance statistic, such as a histogram, of the digital image. As shown is FIG. 3, the image analysis unit 310 is communicated with the preliminary tone mapping function generating unit 320 and the remapped value adjusting unit 330. Specifically, the image analysis unit 310 may access the digital image from the system memory, and provides the average luminance value and the luminance statistic, such as the histogram, to the preliminary tone mapping function generating unit 320 and the remapped value adjusting unit 330 respectively.

The preliminary tone mapping function generating unit 320 may be configured to generate the preliminary tone mapping function $T_P(x)$ according to the average luminance value provided by the image analysis unit 310, as described in step 120. The remapped value adjusting unit 330 may be configured to determine the new remapped values for a plurality of skeleton luminance values according to the preliminary tone mapping function $T_P(x)$ provided by the preliminary tone mapping function generating unit 320 and the luminance statistic provided by the image analysis unit 310, as detailed in step 140.

Based on the plurality of skeleton luminance values and the new remapped values determined in the remapped value adjusting unit 330, the final tone mapping function generating unit 340 may perform step 150 to generate the final tone mapping function $T_F(X)$, for example, in a piecewise form as illustrated in FIG. 2C. The image remapping unit 350 may then remap the digital image through the final tone mapping function $T_F(X)$ generated in the final tone mapping function generating unit 340. The remapped digital image output from the image remapping unit 350 may then be rendered on an output device, such as a monitor, display or a printer.

In a preferred embodiment, all the units described in FIG. 3 are implemented as logic elements in an ASIC (Application Specific Integrated Circuit). In other embodiments according to the present invention, such units may also be implemented as software or hardware modules in a DSP (Digital Signal Processing) based system or a microprocessor based system. In addition, the system memory mentioned above is typically composed of DRAM (dynamic random access memory), but may be any other feasible volatile or non-volatile memory.

The foregoing description of the exemplary embodiment of the invention has been presented for the purposes of illustration and description. It is not intended to be exhaustive or to limit the invention to the precise form disclosed. Many modifications and variations are possible in light of the above teaching. In a variation embodiment of the present invention, any luminance related attribute may be used in place with the luminance component. A color component, such as the red, green, or blue component in the RGB color space, for example, may be used as the target to be remapped through the disclosed tone remapping method. It is intended that the scope of the invention be limited not with this detailed description, but rather by the claims appended hereto.

What is claimed is:

1. A digital image tone remapping method, comprising the steps of:

computing an average luminance value of a digital image by an image analysis device;

generating a preliminary tone mapping function according to said average luminance value by a preliminary tone mapping function generating device, where the preliminary tone mapping function remaps a luminance value greater than said average luminance value through a first local mapping function T1(X)=(Cmax−X)*(X−APL)/Cmax+X, wherein Cmax represents a maximum code value under current bit resolution, X represents said luminance value and APL represents said average luminance value;

generating a luminance statistic of said digital image by the image analysis device;

determining new remapped values for a plurality of skeleton luminance values according to said preliminary tone mapping function and said luminance statistic by a remapped value adjusting device;

generating a final tone mapping function according to said new remapped values and said plurality of skeleton luminance values by a final tone mapping function generating device; and remapping said digital image through said final tone mapping function by an image remapping device.

2. The method of claim 1, wherein said preliminary tone mapping function remaps said average luminance value to itself.

3. The method of claim 2, wherein said preliminary tone mapping function rewraps said luminance value less than said average luminance value through multiplying said luminance value by a factor proportional to said luminance value.

4. The method of claim 3, wherein said preliminary tone mapping function remaps said luminance value less than said average luminance value through a second local mapping function $T2(X)=X*(X/APL+r0*(APL-X)/Cmax)$, wherein $r0$ is a predetermined number between 0 and 1.

5. The method of claim 1, wherein one of said new remapped value is determined such that difference between said new remapped value and a preliminary remapped value is proportional to an adjusting factor derived from said luminance statistic, wherein said preliminary remapped value is a remapped value of said plurality of skeleton luminance values through said preliminary tone mapping function.

6. The method of claim 5, wherein said adjusting factor is derived from a ratio of a first pixel count to a second pixel count, said first pixel count being a count of pixels with luminance values less than said plurality of skeleton luminance values and lying in a first range, and said second pixel count being a count of pixels with luminance values greater than said plurality of skeleton luminance values and lying in a second range, wherein said first range and said second range comprise substantially identical number of luminance values.

7. The method of claim 1, wherein said final tone mapping function is a piecewise linear tone remapping function represented by a plurality of line segments consecutively connected to each other one by one, wherein said new remapped values and said plurality of skeleton luminance values define at least one end point of said line segment.

8. A digital image tone remapping apparatus, comprising:
an image analysis device, configured for computing an average luminance value of a digital image and generating a luminance statistic of said digital image;
a preliminary tone mapping function generating device, configured for generating a preliminary tone mapping function according to said average luminance value, where the preliminary tone mapping function remaps a luminance value greater than said average luminance value through a first local mapping function $T1(X)=(Cmax-X)*(X-APL)/Cmax+X$, wherein Cmax represents a maximum code value under current bit resolution, X represents said luminance value and APL represents said average luminance value;
a remapped value adjusting device, configured for determining new remapped values for a plurality of skeleton luminance values according to said preliminary tone mapping function and said luminance statistic;
a final tone mapping function generating device, configured for generating a final tone mapping function according to said new remapped values and said plurality of skeleton luminance values; and
an image remapping device, configured for remapping said digital image through said final tone mapping function.

9. The apparatus of claim 8, wherein said preliminary tone mapping function remaps said average luminance value to itself.

10. The apparatus of claim 9, wherein said preliminary tone mapping function remaps said luminance value less than said average luminance value through multiplying said luminance value by a factor proportional to said luminance value.

11. The apparatus of claim 10, wherein said preliminary tone mapping function remaps said luminance value less than said average luminance value through a second local mapping function $T2(X)=X*(X/APL+r0*(APL-X)/Cmax)$, wherein $r0$ is a predetermined number between 0 and 1.

12. The apparatus of claim 8, wherein one of said new remapped value is determined such that difference between said new remapped value and a preliminary remapped value is proportional to an adjusting factor derived from said luminance statistic, wherein said preliminary remapped value is a remapped value of said plurality of skeleton luminance values through said preliminary tone mapping function.

13. The apparatus of claim 12, wherein said adjusting factor is derived from a ratio of a first pixel count to a second pixel count, said first pixel count being a count of pixels with luminance values less than said plurality of skeleton luminance values and lying in a first range, and said second pixel count being a count of pixels with luminance values greater than said plurality of skeleton luminance values and lying in a second range, wherein said first range and said second range comprise substantially identical number of luminance values.

14. The apparatus of claim 8, wherein said final tone mapping function is a piece wise linear tone remapping function represented by a plurality of line segments consecutively connected to each other one by one, wherein said new remapped values and said plurality of skeleton luminance values define at least one end point of said line segment.

15. A digital image tone remapping method, comprising the steps of:
computing an average luminance value of a digital image by an image analysis device;
generating a preliminary tone mapping function according to said average luminance value by a preliminary tone mapping function generating device, where the preliminary tone mapping function rewraps a luminance value less than said average luminance value through a local mapping function $T(X)=X*(X/APL+r0*(APL-X)/Cmax)$, wherein Cmax represents a maximum code value under current bit resolution, $r0$ is a predetermined number between 0 and 1, X represents said luminance value and APL represents said average luminance value;
generating a luminance statistic of said digital image by the image analysis device;
determining new remapped values for a plurality of skeleton luminance values according to said preliminary tone mapping function and said luminance statistic by a remapped value adjusting device;
generating a final tone mapping function according to said new remapped values and said plurality of skeleton luminance values by a final tone mapping function generating device; and
remapping said digital image through said final tone mapping function by an image remapping device.

16. A digital image tone remapping apparatus, comprising:
an image analysis device, configured for computing an average luminance value of a digital image and generating a luminance statistic of said digital image;
a preliminary tone mapping function generating device, configured, for generating a preliminary tone mapping function according to said average luminance value, where the preliminary tone mapping function remaps a luminance value less than said average luminance value through a local mapping function $T(X)=X*(X/APL+r0*(APL-X)/Cmax)$, wherein Cmax represents a maximum code value under current bit resolution, r0 is a predetermined number between 0 and 1, X represents said luminance value and APL represents said average luminance value;

a remapped value adjusting device, configured for determining new remapped values for a plurality of skeleton luminance values according to said preliminary tone mapping function and said luminance statistic;

a final tone mapping function generating device, configured for generating a final tone mapping function according to said new remapped values and said plurality of skeleton luminance values; and an image remapping device, configured for remapping said digital image through said final tone mapping function.

* * * * *